United States Patent
Winer et al.

(10) Patent No.: US 10,303,295 B2
(45) Date of Patent: May 28, 2019

(54) MODIFYING AN ON-SCREEN KEYBOARD BASED ON ASYMMETRIC TOUCH DRIFT

(71) Applicant: Apple Inc., Cupertino, CA (US)

(72) Inventors: Morgan Winer, Sunnyvale, CA (US); Nicholas K. Jong, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/509,652

(22) Filed: Oct. 8, 2014

(65) Prior Publication Data

US 2015/0346905 A1 Dec. 3, 2015

Related U.S. Application Data

(60) Provisional application No. 62/055,536, filed on May 30, 2014.

(51) Int. Cl.
 G06F 3/041 (2006.01)
 G06F 3/0488 (2013.01)
 G06F 3/044 (2006.01)

(52) U.S. Cl.
 CPC ............ G06F 3/0418 (2013.01); G06F 3/044 (2013.01); G06F 3/04886 (2013.01)

(58) Field of Classification Search
 None
 See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,256,021 B1 * | 7/2001 | Singh .................... | G06F 3/0418 345/173 |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,300,023 B2 | 10/2012 | Forutanpour et al. | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Joseph R Haley
*Assistant Examiner* — Emily J Frank
(74) *Attorney, Agent, or Firm* — Morrison & Foerster LLP

(57) ABSTRACT

Utilization of error vector data representative of errors between the location of actual keystrokes and the location of determined intended keystrokes to compute "bias" data indicative of the magnitude and direction of error vectors for a given location on the virtual keyboard is disclosed. This bias data can then be used to perform a number of operations such as keyboard re-spotting.

23 Claims, 8 Drawing Sheets

(56) References Cited

U.S. PATENT DOCUMENTS

| | | |
|---|---|---|
| 8,479,122 B2 | 7/2013 | Hotelling et al. |
| 2006/0197753 A1 | 9/2006 | Hotelling |
| 2010/0312511 A1* | 12/2010 | Tseng .................. G06F 3/04886 702/95 |
| 2010/0313120 A1* | 12/2010 | Ho ........................ G06F 3/0237 715/261 |
| 2012/0249596 A1 | 10/2012 | Colley |
| 2013/0044063 A1 | 2/2013 | Kim |
| 2013/0222247 A1* | 8/2013 | Liu ........................ G06F 3/0418 345/168 |
| 2013/0268879 A1* | 10/2013 | Zhang .................. G06F 3/0418 715/773 |
| 2014/0082545 A1* | 3/2014 | Zhai .................... G06F 3/04886 715/773 |
| 2014/0096059 A1* | 4/2014 | Hauser .................. G06F 3/0487 715/771 |
| 2014/0198047 A1* | 7/2014 | Unruh .................. G06F 3/0237 345/168 |
| 2014/0313162 A1* | 10/2014 | Jo ........................ G06F 3/0418 345/174 |
| 2015/0242053 A1* | 8/2015 | Gao ...................... G06F 3/0418 345/178 |
| 2016/0070413 A1* | 3/2016 | Geaghan ............... G06F 3/0416 345/174 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

MODIFYING AN ON-SCREEN KEYBOARD BASED ON ASYMMETRIC TOUCH DRIFT

FIELD OF THE DISCLOSURE

This relates generally to touch sensing, and more particularly to the processing of keystroke error vector data to enable subsequent operations.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device.

Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch.

On-screen keyboards, such as virtual keyboards on touch screens, are widely used in portable computing devices, but do not offer the same tactile feedback as conventional keyboards. For example, the tactile feel and sound of the depression of mechanical keys, which can be useful in providing feedback to the typist on the accuracy and completion of keystrokes, can be missing from a virtual keyboard. As a result, a typist's fingers can drift with respect to the location of the virtual keys. In addition, when thumb typing is desired or necessitated by the size or location of the virtual keyboard, the typist's thumb or thumbs can also drift or miss the mark with respect to the location of the virtual keys. In particular, when single-thumb typing is necessitated on a larger virtual keyboard, it can be difficult to reach the virtual keys on the inner part of the device that are farthest away from the thumb.

SUMMARY OF THE DISCLOSURE

When fingers, thumbs and hands drift or miss the mark when typing on virtual keyboards with little or no tactile feedback, typing auto-correction algorithms can be used to predict intended keystrokes. Some typing auto-correction algorithms utilize "best-fit" constellation analysis along with word predictors to determine intended keystrokes and correct mis-typing. Regardless of the algorithms used, these typing auto-correction algorithms compute, or capture the data necessary to compute, an error vector between the location of each actual keystroke and the location of determined intended keystrokes. Some examples of the disclosure utilize these error vectors to compute "bias" data indicative of the magnitude and direction of error vectors for a given location on the virtual keyboard. This bias data can then be used to perform a number of operations such as keyboard re-spotting.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

When fingers, thumbs and hands drift or miss the mark when typing on virtual keyboards with little or no tactile feedback, typing auto-correction algorithms can be used to predict intended keystrokes. Some typing auto-correction algorithms utilize "best-fit" constellation analysis along with word predictors to determine intended keystrokes and correct mis-typing. Regardless of the algorithms used, these typing auto-correction algorithms compute, or capture the data necessary to compute, an error vector between the location of each actual keystroke and the location of determined intended keystrokes. Some examples of the disclosure utilize these error vectors to compute "bias" data indicative of the magnitude and direction of error vectors for a given location on the virtual keyboard. This bias data can then be used to perform a number of operations such as keyboard re-spotting, which is the horizontal or horizontal (or combination thereof) re-positioning of the virtual keyboard in a an attempt to reduce error vectors, keyboard resizing (scaling of keyboard size), and the like. Although the description herein may refer to virtual keyboards, it should be understood that examples of the disclosure are not limited to bias data for virtual keyboards, but are also applicable to other user interfaces where mis-hits can be identified and error vectors can be determined.

Figure 1A:
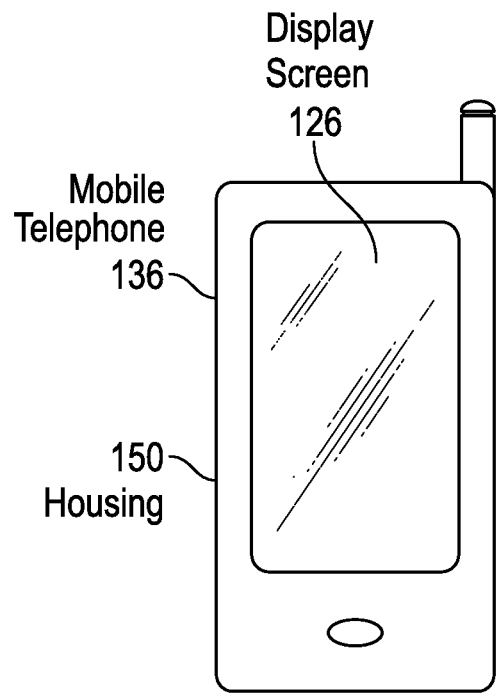
FIG. 1A illustrates an example mobile telephone that includes a touch screen.
Figure 1B:
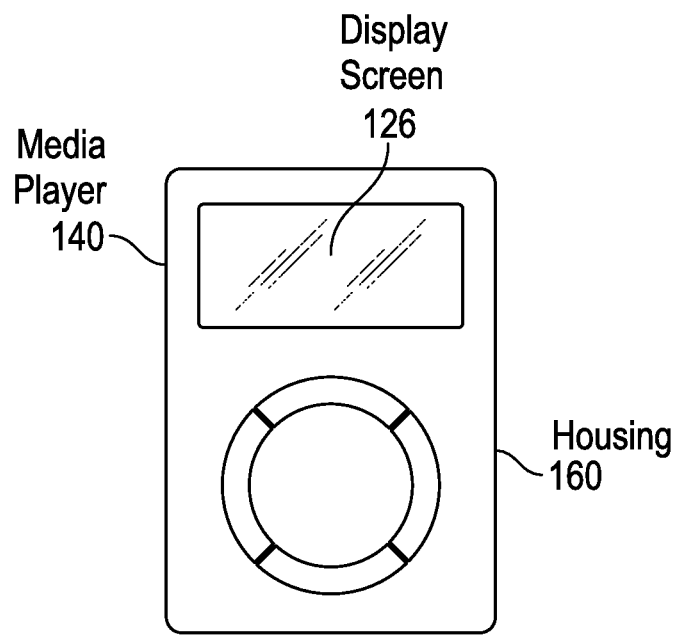
FIG. 1B illustrates an example digital media player that includes a touch screen.
Figure 1C:
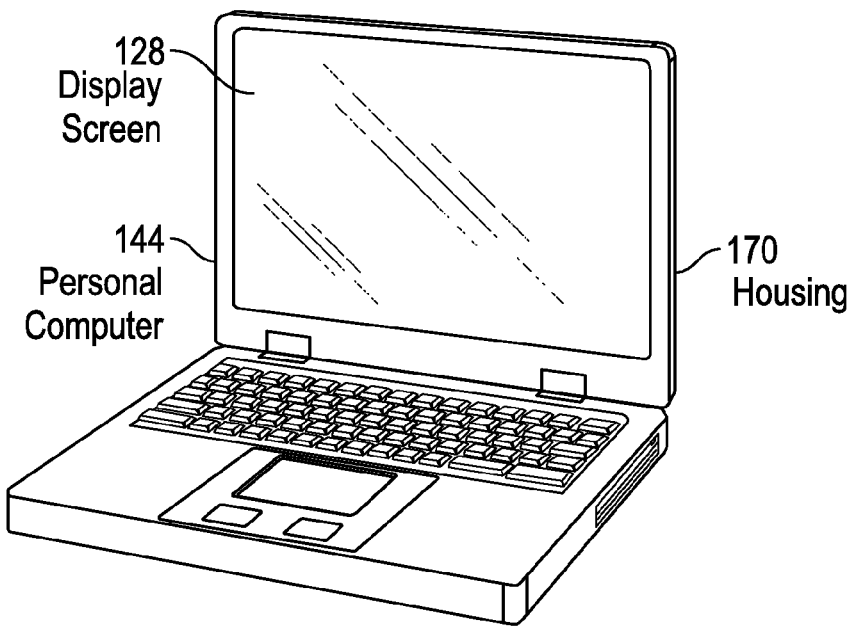
FIG. 1C illustrates an example personal computer that includes a touch screen.
Figure 1D:
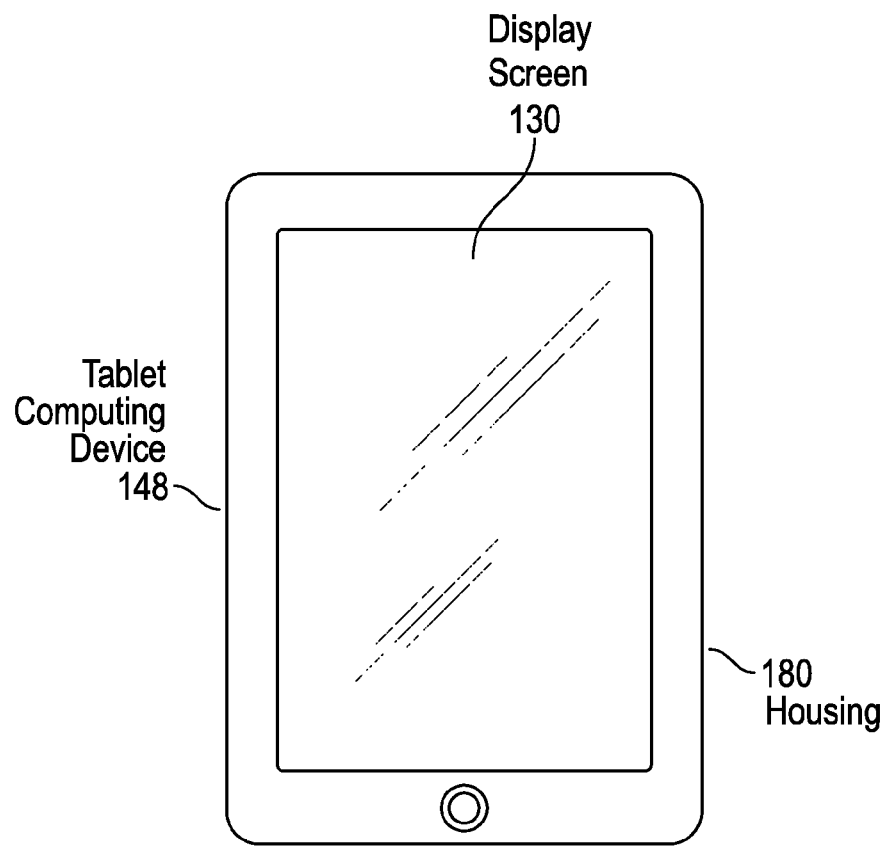
FIG. 1D illustrates an example tablet computing device that includes a touch screen.

FIGS. 1A-1D illustrate systems in which examples of the disclosure can be implemented. FIG. 1A illustrates an exemplary mobile telephone 136 that includes a display screen 124 packaged in housing 150. FIG. 1B illustrates an exemplary digital media player 140 that includes a display screen 126 packaged in housing 160. FIG. 1C illustrates an exemplary personal computer 144 that includes a display screen 128 packaged in housing 170. FIG. 1D illustrates an exemplary tablet computing device 148 that includes a display screen 130 packaged in housing 180. Touch screens 124, 126, 128 and 130 can display virtual keyboards, and can be based on any number of touch sensing technologies, such as resistive, acoustic, optical, mutual capacitive, or self capacitive, to name just a few examples.

A self-capacitance based touch system can include small plates of conductive material that can be referred to as touch pixels or touch pixel electrodes. During operation, the touch pixel can be stimulated with an AC waveform and the self-capacitance of the touch pixel can be measured. As an object approaches the touch pixel, the self-capacitance of the touch pixel can change. This change in the self-capacitance of the touch pixel can be detected and measured by the touch sensing system to determine the positions of multiple objects when they touch, or come in proximity to, the touch screen.

A mutual capacitance based touch system can include drive and sense lines that may cross over each other on different layers, or may be adjacent to each other on the same layer. The crossing or adjacent locations can be referred to as touch pixels or touch pixel electrodes. During operation, the drive line can be stimulated with an AC waveform and the mutual capacitance of the touch pixel can be measured. As an object approaches the touch pixel, the mutual capacitance of the touch pixel can change. This change in the mutual capacitance of the touch pixel can be detected and measured by the touch sensing system to determine the positions of multiple objects when they touch, or come in proximity to, the touch screen. In some examples, a touch screen can be multi-touch, single touch, projection scan, full-imaging multi-touch, capacitive touch, etc.

Figure 2:
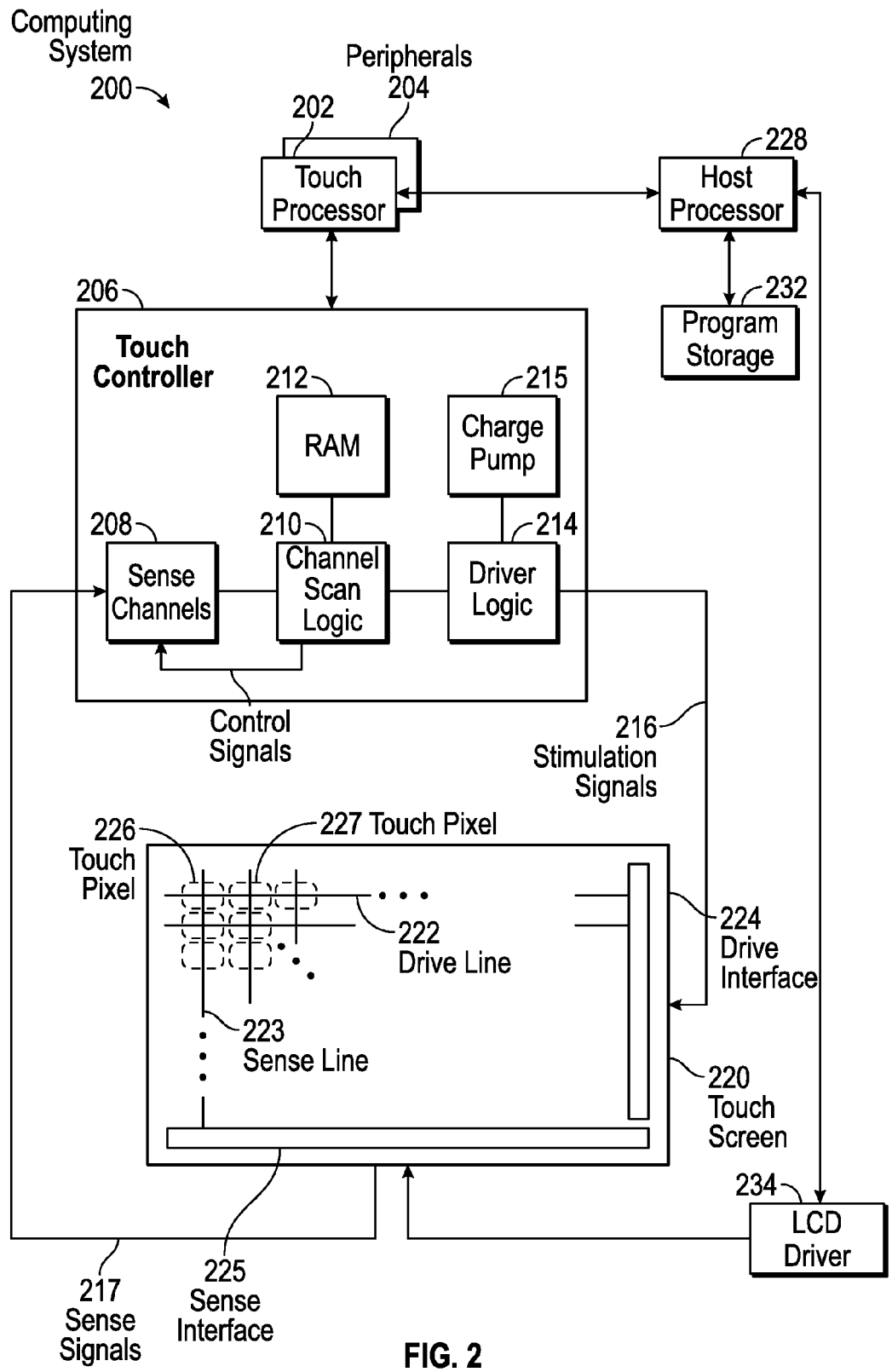
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC).

It should be apparent that the architecture shown in FIG. 2 is only one example architecture of system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller, such as a Liquid-Crystal Display (LCD) driver 234. It is understood that although the examples of the disclosure are described with reference to LCD displays, the scope of the disclosure is not so limited and can extend to other types of displays, such as Light-Emitting Diode (LED) displays, including Active-Matrix Organic LED (AMOLED) and Passive-Matrix Organic LED (PMOLED) displays.

Host processor 228 can use LCD driver 234 to generate an image on touch screen 220, such as an image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

In some examples, RAM 212, program storage 232, or both, can be non-transitory computer readable storage media. One or both of RAM 212 and program storage 232 can have stored therein instructions, which when executed by touch processor 202 or host processor 228 or both, can cause the device including system 200 to perform one or more functions and methods of one or more examples of this disclosure.

In some examples, touch screen 220 can include mutual capacitance touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (i.e., a pattern of fingers touching the touch screen). Although not shown in the example of FIG. 2, touch screen 220 can alternatively include self-capacitance touch sensing circuitry including an array of self-capacitance electrodes, as described above.

Virtual keyboards are common on today's portable computing devices. In some examples of the disclosure, these virtual keyboards may contain virtual keys sized for touch typing with both hands. In some examples, the virtual keyboards are smaller virtual keyboards intended for "hunt-and-peck" typing such as thumb typing (using one or both thumbs).

Figure 3A:
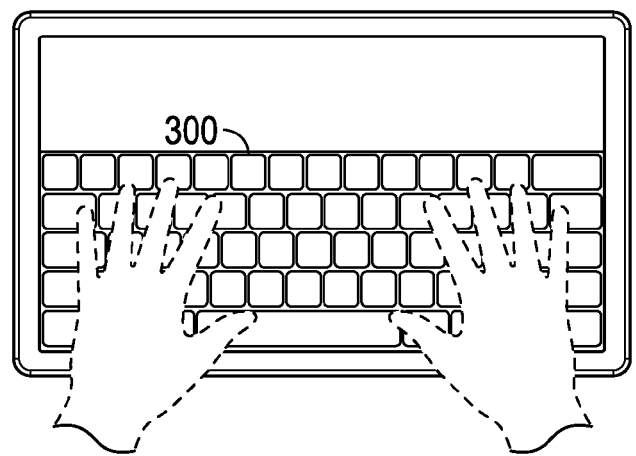
FIG. 3a illustrates an exemplary virtual keyboard that stretches a full width of a display (or nearly so) according to some examples of the disclosure.

FIG. 3a illustrates an exemplary virtual keyboard 300 that stretches a full width of a display (or nearly so) according to some examples of the disclosure. Such keyboards can enable two-handed touch typing.

Figure 3B:
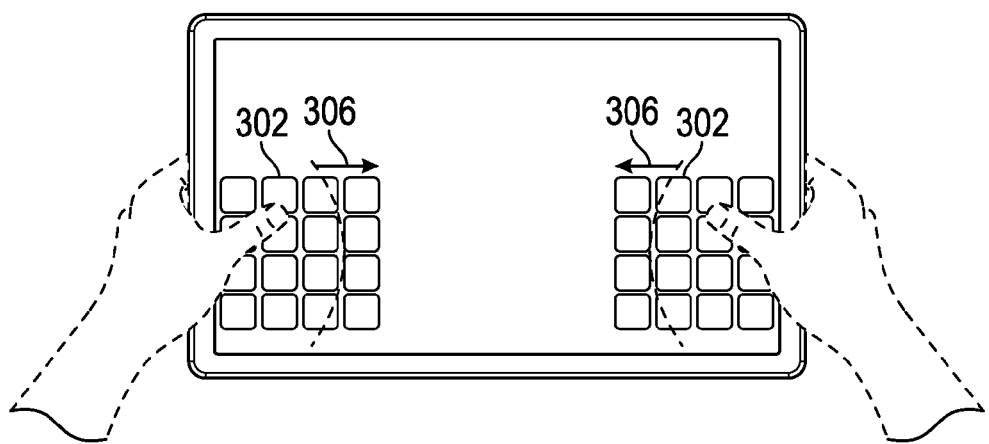
FIG. 3b illustrates an exemplary spilt virtual keyboard that is spilt into two partial virtual keyboards anchored to opposite edges of the display according to some examples of the disclosure.

FIG. 3b illustrates an exemplary spilt virtual keyboard 302 that is spilt into two partial virtual keyboards anchored to opposite edges of the display according to some examples of the disclosure. These split virtual keyboards are intended for two-thumb typing.

Figure 3C:
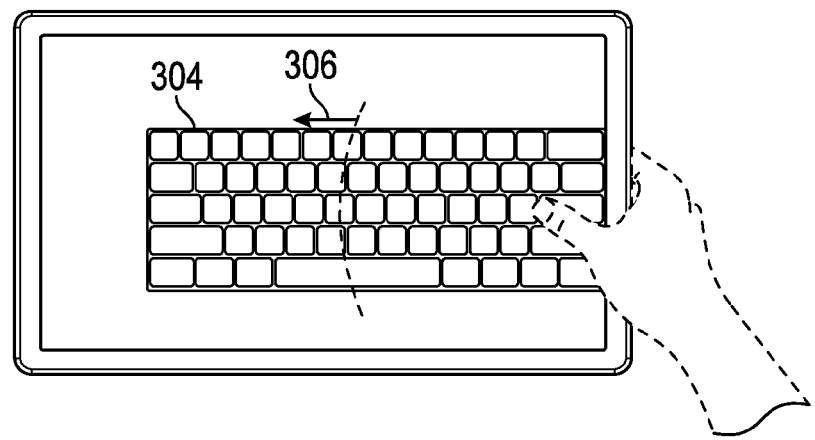
FIG. 3c illustrates an exemplary virtual keyboard that is anchored to one side of the display according to some examples of the disclosure.

FIG. 3c illustrates an exemplary virtual keyboard 304 that is anchored to one side of the display according to some examples of the disclosure. Such keyboards are intended for single-thumb typing.

In any of the examples disclosed above, but particularly for the examples of FIGS. 3b and 3c, a typist's finger or thumb may have difficulty reaching all of the keys in the virtual keyboard. This can be especially true for virtual keys located away from the typist's thumb or finger, towards the center of the device, such as areas 306. In those areas, touches are more likely to be biased away from the center of the device and towards the edge of the device being grasped by the typist's hand, indicative of the inability of the typist to reach far enough into the center area of the device to hit the center of the virtual key.

Figure 4A:
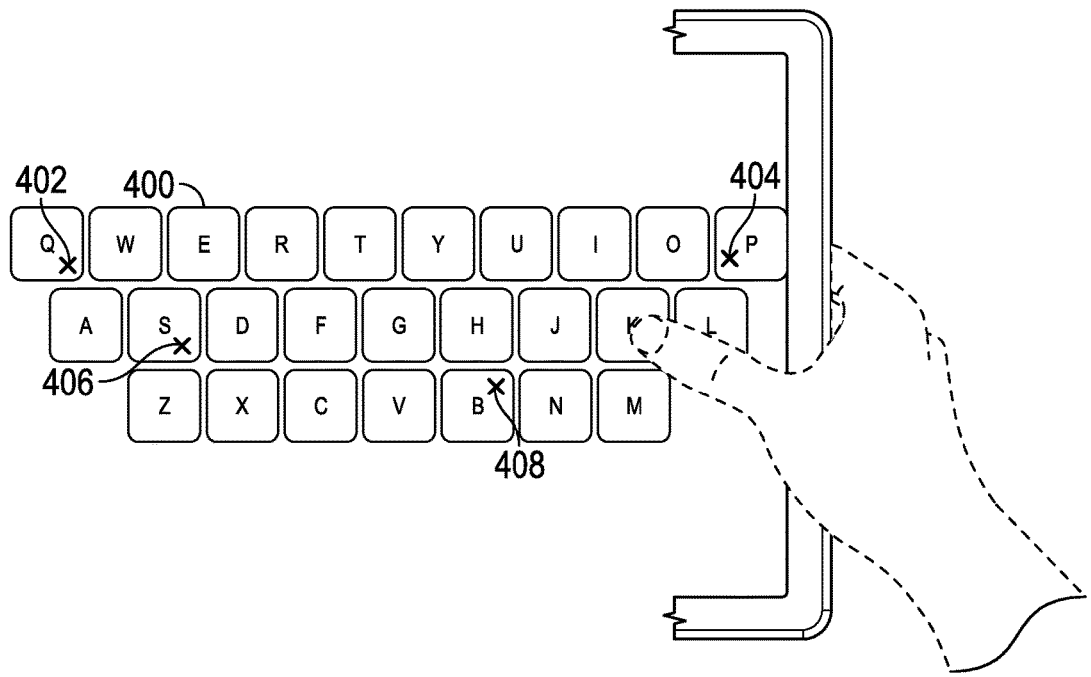
FIG. 4a illustrates an exemplary virtual keyboard that is anchored to one side of a display area according to some examples of the disclosure.

FIG. 4a illustrates an exemplary virtual keyboard 400 that is anchored to one side of a display area according to some examples of the disclosure. In the example of FIG. 4a, the X's can represent the centroids of actual keystrokes. Keystrokes towards the center of the device and away from the typist's hand (such as keystroke 402 targeting the Q key, for example), are biased more towards the right edge of the display than keystrokes close to the right edge of the display (such as keystroke 404 targeting the P key, for example, which may be biased in the opposite direction). Keystrokes between those two extremes (such as keystroke 406 targeting the S key or keystroke 408 targeting the B key, for example) can have incrementally more error, biased towards the typist's hand, as they move farther away from the right edge of the display and towards the center of the device. When a touch intended for a particular virtual key misses the mark, the distance and direction of the miss-hit as measured from the center of the intended key can represent an error vector.

Figure 4B:
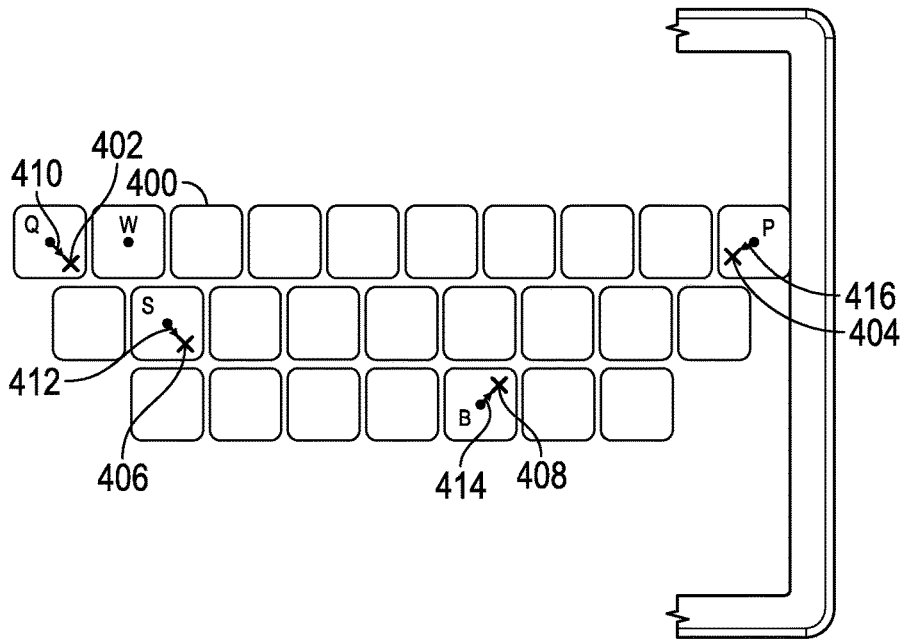
FIG. 4b illustrates error vectors for the exemplary keystrokes of FIG. 4a according to some examples of the disclosure.

FIG. 4b illustrates error vectors for the exemplary keystrokes of FIG. 4a according to some examples of the disclosure. In the example of FIG. 4b, error vector 410 corresponds to keystroke 402, error vector 412 corresponds to keystroke 406, error vector 414 corresponds to keystroke 408, and error vector 416 corresponds to keystroke 404. In some examples, computation of the error vector can first require an identification of the intended virtual key. For example, computation of error vector 410 can first require identification of the Q key (and not the W key) as the intended key. Accordingly, in some examples, typing auto-correction algorithms can be utilized to identify the intended virtual key. After the intended virtual key is determined, the location of the actual keystroke and the location of the intended key can be used to compute error vectors. However, in some examples, typing auto-correction algorithms need not be used. In such examples, computation of the error vector may only require an identification of a closest virtual key, without any determination of whether this was the intended virtual key. It should be understood, therefore, that without typing auto-correction, the error vectors can be based on incorrect intended virtual keys, and therefore the error vectors themselves can be erroneous.

Figure 5A:
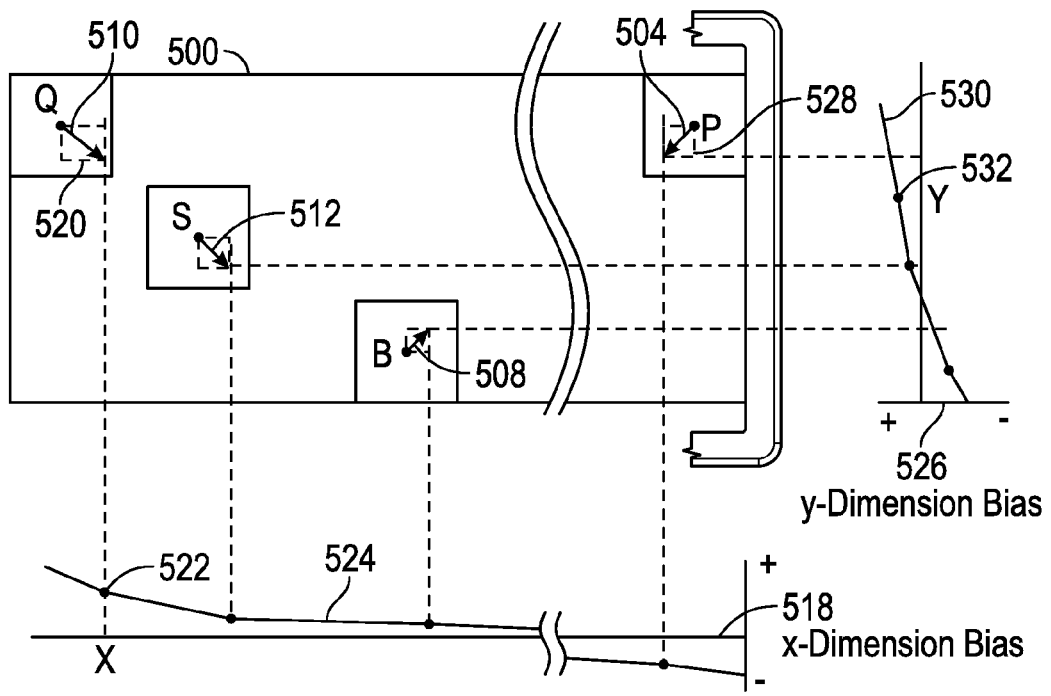
FIG. 5a illustrates an exemplary virtual keyboard with miss-hits and error vectors according to some examples of the disclosure.

FIG. 5a illustrates an exemplary virtual keyboard 500 according to some examples of the disclosure. FIG. 5a also illustrates some exemplary miss-hits and corresponding error vectors for purposes of illustration only. In some examples of the disclosure, the magnitude of error vectors for one or more dimensions can be processed over a predetermined period of time. In some examples, the processing can include accumulating and averaging the error vectors, though it should be understood that the error vectors can be processed in other ways, including identifying the maximum error vector received over the predetermined period of time, to name just one example. In the example of FIG. 5a, the x-components of the magnitude of error vectors for a given location on the x-axis, as accumulated and averaged over time, are shown at 518, wherein positive magnitude values are defined as being biased to the right. For example, the x-component 520 of error vector 510 can be averaged into the bias data at point 522 on bias plot 524. Point 522 represents the average magnitude in the x-direction of error vectors whose actual (as opposed to intended) location is X units from the right edge of the virtual keyboard 500, wherein a positive average magnitude indicates a bias to the right. Similarly, the y-components of the magnitude of error vectors for a given location on the y-axis, as accumulated and averaged over time, are shown at 526, wherein positive magnitude values are defined as being biased downward. For example, the y-component 528 of error vector 504 can be averaged into the bias data at point 532 on bias plot 530. Point 532 represents the average magnitude in the y-direction of error vectors whose actual (as opposed to intended) location is Y units from the bottom edge of the virtual keyboard 500, wherein a positive average magnitude indicates a bias downward.

Bias plots such as those shown in FIG. 5a can be generated regardless of the configuration of the virtual keyboard. For example, even with the split keyboard of FIG. 3b, a single x-component bias plot can be generated across the entire width of the display, or alternatively separate x and y component bias plots can be created for each of the two split keyboard regions.

Figure 5B:
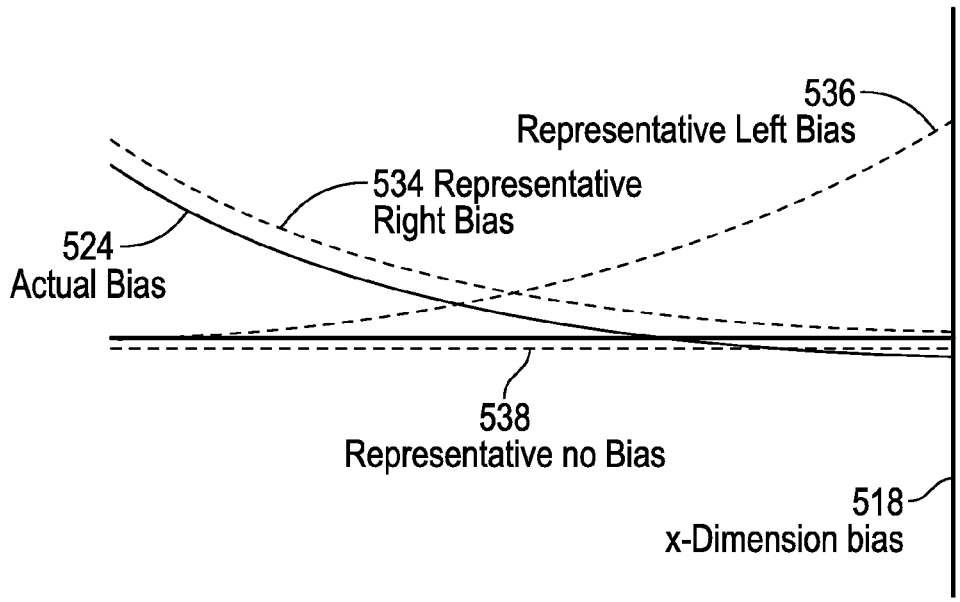
FIG. 5b illustrates an exemplary bias plot as compared to representative curves according to some examples of the disclosure.

FIG. 5b illustrates an exemplary bias plot 524 as compared to representative curves according to some examples of the disclosure. In the example of FIG. 5b, representative curves for right bias 534, left bias 536, and no bias 538 are shown. A comparison of the actual bias plot 524 to the representative right bias plot 534, representative left bias plot 536, and representative no bias plot 538 can be made. Based on the comparison and a determination of which representative bias plot most closely matches the actual bias plot 524 (using conventional best-fit algorithms, for example), the bias plot 524 can be designated right bias, left bias, or no bias. In some examples, only these designations are saved and passed along to other programs or processors/memory for downstream use. Alternatively, in some examples, only the bias data is passed along to other programs or processors/memory for downstream use. Alternatively, in some examples, both the bias data and the designations are passed along to other programs or processors/memory for downstream use.

Figure 6:
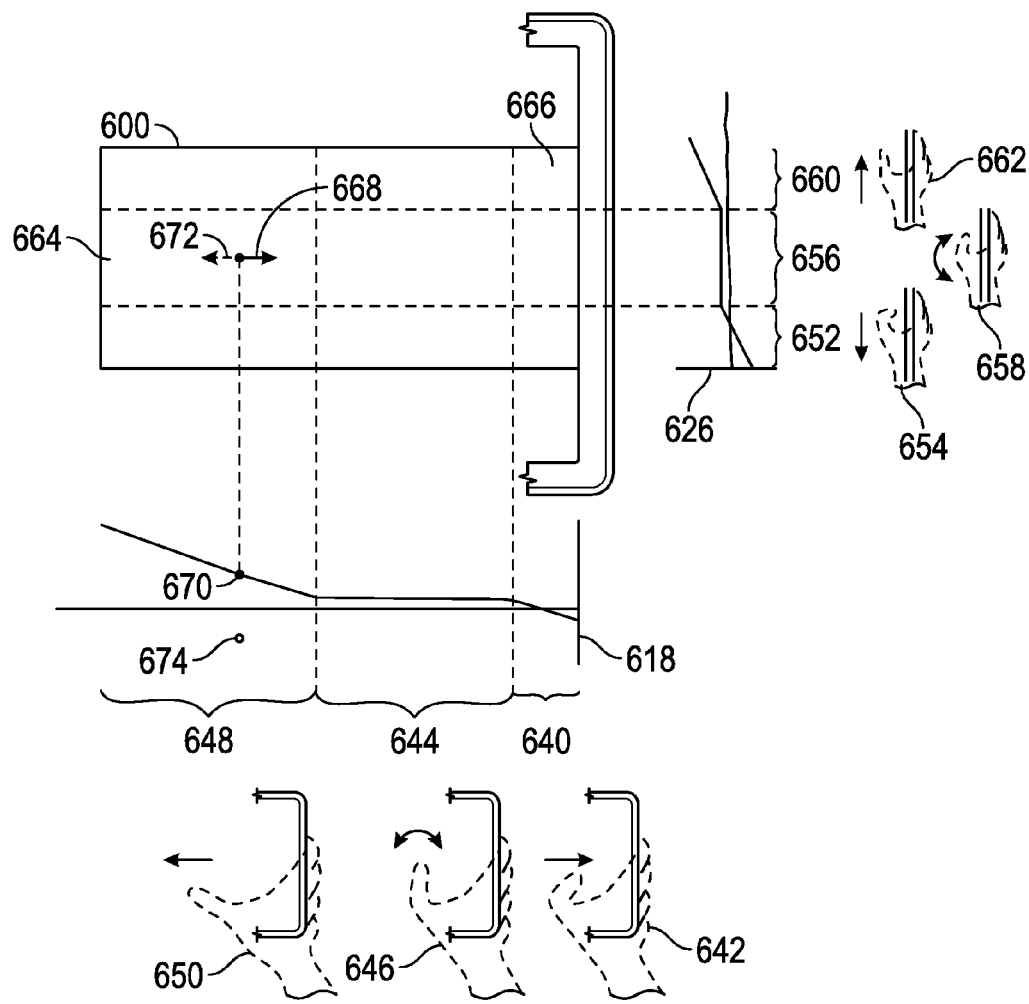
FIG. 6 illustrates an exemplary virtual keyboard and x and y component bias plots according to some examples of the disclosure.

FIG. 6 illustrates an exemplary virtual keyboard 600 and x and y component bias plots 618 and 626 according to some examples of the disclosure. In the example of FIG. 6, x-component bias plot 618 can be separated into three distinct regions by analyzing the values and slope of the plot. Region 640 can be characterized by a negative bias (e.g., an error bias to the left of the intended key) that increases more negatively as the right edge of the display is approached. This region can be the result of a thumb unable to reach fully to the right, as shown at 642. Region 644 can be characterized by little or no bias. This region can be the result of a thumb moving comfortably around its resting position, as shown at 646. Region 648 can be characterized by a positive bias (e.g., an error bias to the right of the intended key) that increases more positively as the target area gets further away from the right edge of the display. This region can be the result of a thumb unable to reach fully to the left, as shown at 650.

Similarly, y-component bias plot 626 can be separated into three distinct regions by analyzing the values and slope of the plot. Region 652 can be characterized by a negative bias (e.g., an error bias above the intended key) that increases more negatively as the bottom edge of the display is approached. This region can be the result of a thumb unable to reach fully downwards, as shown at 654. Region 656 can be characterized by little or no bias. This region can be the result of a thumb moving comfortably around its resting position, as shown at 658. Region 660 can be characterized by a positive bias (e.g., an error bias below the intended key) that increases more positively as the target area gets further away from the bottom edge of the display. This region can be the result of a thumb unable to reach fully upwards, as shown at 662.

It should be understood that although FIG. 6 shows three x-component regions and three y-component regions, any number of regions can be identified based on characteristics of the bias plots. In some examples, x-component regions 640, 644 and 648 can be passed along to other programs or processors/memory for downstream use, along with information about each of those regions, such as slope of the bias and whether the bias is positive or negative. In some examples, y-component regions 652, 656 and 660 can be passed along to other programs or processors/memory for downstream use, along with information about each of those regions, such as slope of the bias and whether the bias is positive or negative. In some examples, both x and y component regions and corresponding information can be passed along to other programs or processors/memory for downstream use.

In some examples of the disclosure, the x and y component regions can be utilized to identify virtual keyboard regions with certain characteristics. In the example of FIG. 6, region 664 can be identified as a region with a positive x-direction bias and no y-direction bias. Region 666 can be identified as a region with negative x-direction bias and a positive y-direction bias. These regions, and their characteristics, can be passed along to other programs or processors/memory for downstream use.

As discussed above, the bias data can be accumulated and averaged over time. In some examples of the disclosure, individual error vector magnitudes can be discarded after they are accumulated and averaged. However, in some examples, individual error vector magnitudes or polarities that are significantly different from the average at that location on the keyboard can be saved. In some examples, different weightings can be assigned to these individually saved error vector magnitudes depending on their characteristics and location on a particular axis. Using FIG. 6 as an example, region 664 can be identified as a virtual keyboard region with an average positive x-direction bias and no y-direction bias, which can be represented by average bias vector 668 and a corresponding positive x-direction bias at point 670. However, suppose that an anomalous keystroke was received in that area that with a negative x-direction bias and no y-direction bias as represented by bias vector 672 and point 674. Without weighting, data point 674 can be averaged together with other data points, but its existence and significance may thereafter be lost. However, with weighting, data point 674 can optionally be saved, and can be interpreted as an indication that the user is not really having trouble reaching the virtual keys at that location. In some examples, an anomalous bias data point can be identified as having a direction opposite from the average, and/or a magnitude that is different from the average by greater than a threshold amount. This anomalous data and/or interpretations of this anomalous data can be passed along to other programs or processors/memory for downstream use.

As discussed above, the bias plots, bias designations, identified bias regions, bias region characteristics and anomalous data for one or more directions (i.e., X and/or Y directions) can be passed along to other programs or processors/memory running in the device or in other devices for downstream use. These programs can utilize this information to perform various operations including, but not limited to, adjusting the size, location, and aspect ratio of the virtual keyboard or individual keys in one or more directions for one or more of the regions, or performing other types of compensation. In some examples, a pop-up can appear that asks the user if help is needed correcting for typing errors, adjusting the virtual keyboard, and the like.

Figure 7:
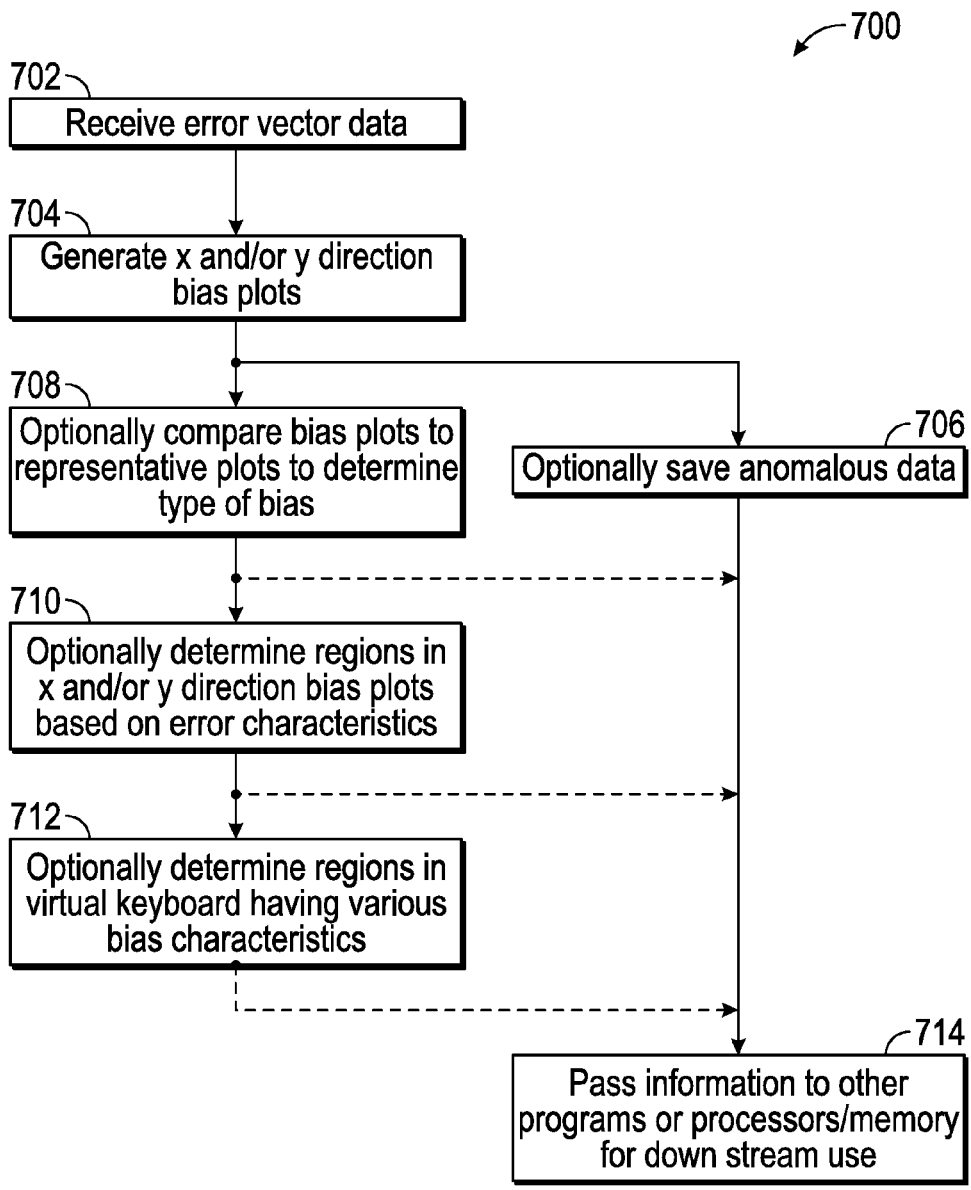
FIG. 7 illustrates an exemplary flowchart for processing bias data according to some examples of the disclosure.

FIG. 7 illustrates an exemplary flowchart 700 for processing bias data according to some examples of the disclosure. First, error vector data is received at 702. As error vector data is received and averaged, x or y direction bias plots can be generated at 704. In some examples, while generating x or y direction bias plots, anomalous data can be saved at 706. In some examples, the bias plots can be compared to representative plots to determine a type of bias at 708. In some examples, the bias plots can be analyzed, and certain regions in the bias plots can be identified based on characteristics of the bias plots at 710. In some examples, based in the identified regions, two-dimensional regions in the virtual keyboard can be determined that have certain characteristics at 712. In some examples, one or more of the bias plots, anomalous bias data, determined bias types, x or y direction regions, or two-dimensional virtual keyboard regions and their characteristics can be passed along to other programs or processors/memory for downstream use at 714.

Therefore, according to the above, some examples of the disclosure are directed to a method of providing keystroke accuracy information for use in performing subsequent operations, comprising: receiving error vector data, the error vector data comprising a plurality of error vectors between actual and intended keystroke locations; averaging the error vector data obtained at each of a plurality of locations on a keyboard to generate a bias plot; and transmitting information associated with the bias plot. Alternatively or additionally to one or more of the examples disclosed above, in some examples the method further comprises receiving the error vector data from a typing auto-correction algorithm. Alternatively or additionally to one or more of the examples disclosed above, in some examples the method further comprises computing the error vector data by determining vectors between the actual keystroke and a closest key location. Alternatively or additionally to one or more of the examples disclosed above, in some examples the method further comprises comparing the bias plot to one or more representative bias curves; determining which of the one or more representative bias curves most closely matches the bias plot; characterizing the bias plot in accordance with the representative bias curve that most closely matches the bias plot; and transmitting the characterization of the bias plot. Alternatively or additionally to one or more of the examples disclosed above, in some examples the one or more representative bias curves include one or more of a right bias curve, a left bias curve, and a no bias curve. Alternatively or additionally to one or more of the examples disclosed above, in some examples the information comprises the bias plot itself. Alternatively or additionally to one or more of the examples disclosed above, in some examples the method further comprises identifying a plurality of regions in the bias plot, each region containing similar characteristics; and transmitting the identified plurality of regions and their characteristics. Alternatively or additionally to one or more of the examples disclosed above, in some examples averaging the error vector data comprises averaging a first component of the plurality of error vectors at each of a plurality of first component locations of the keyboard to generate a first component bias plot. Alternatively or additionally to one or more of the examples disclosed above, in some examples the method further comprises comparing the first component bias plot to one or more representative bias curves; determining which of the one or more representative bias curves most closely matches the first component bias plot; characterizing the first component bias plot in accordance with the representative bias curve that most closely matches the first component bias plot; and transmitting the characterization of the first component bias plot. Alternatively or additionally to one or more of the examples disclosed above, in some examples averaging the error vector data further comprises averaging a second component of the plurality of error vectors at each of a plurality of second component locations of the keyboard to generate a second component bias plot, and wherein the first component of the error vectors is orthogonal to the second component of the error vectors. Alternatively or additionally to one or more of the examples disclosed above, in some examples the method further comprises identifying a plurality of first component regions in the first component bias plot, each first component region containing similar characteristics; identifying a plurality of second component regions in the second component bias plot, each second component region containing similar characteristics; transmitting the identified pluralities of first and second component regions and their characteristics. Alternatively or additionally to one or more of the examples disclosed above, in some examples the method further comprises identifying a plurality of virtual keyboard regions from the identified pluralities of first and second component regions, each of the virtual keyboard regions containing similar characteristics; and transmitting the plurality of virtual keyboard regions and their characteristics. Alternatively or additionally to one or more of the examples disclosed above, in some examples the method further comprises saving error vector data exceeding a predetermined threshold; and transmitting the saved error vector data.

Some examples of the disclosure are directed to a non-transitory computer-readable storage medium having stored therein instructions, which when executed by a device, cause the device to perform a method comprising: receiving error vector data, the error vector data comprising a plurality of error vectors between actual and intended keystroke locations; averaging the error vector data obtained at each of a plurality of locations on a keyboard to generate a bias plot; and transmitting information associated with the bias plot. Alternatively or additionally to one or more of the examples disclosed above, in some examples the method further comprises comparing the bias plot to one or more representative bias curves; determining which of the one or more representative bias curves most closely matches the bias plot; characterizing the bias plot in accordance with the representative bias curve that most closely matches the bias plot; and transmitting the characterization of the bias plot. Alternatively or additionally to one or more of the examples disclosed above, in some examples the one or more representative bias curves include one or more of a right bias curve, a left bias curve, and a no bias curve. Alternatively or additionally to one or more of the examples disclosed above, in some examples the method further comprises identifying a plurality of regions in the bias plot, each region containing similar characteristics; and transmitting the identified plurality of regions and their characteristics. Alternatively or additionally to one or more of the examples disclosed above, in some examples averaging the error vector data comprises averaging a first component of the plurality of error vectors at each of a plurality of first component locations of the keyboard to generate a first component bias plot. Alternatively or additionally to one or more of the examples disclosed above, in some examples the method further comprises comparing the first component bias plot to one or more representative bias curves; determining which of the one or more representative bias curves most closely matches the first component bias plot; characterizing the first component bias plot in accordance with the representative bias curve that most closely matches the first component bias plot; and transmitting the characterization of the first component bias plot. Alternatively or additionally to one or more of the examples disclosed above, in some examples averaging the error vector data further comprises averaging a second component of the plurality of error vectors at each of a plurality of second component locations of the keyboard to generate a second component bias plot, and wherein the first component of the error vectors is orthogonal to the second component of the error vectors. Alternatively or additionally to one or more of the examples disclosed above, in some examples the method further comprises identifying a plurality of first component regions in the first component bias plot, each first component region containing similar characteristics; identifying a plurality of second component regions in the second component bias plot, each second component region containing similar characteristics; transmitting the identified pluralities of first and second component regions and their characteristics. Alternatively or additionally to one or more of the examples disclosed above, in some examples the method further comprises identifying a plurality of virtual keyboard regions from the identified pluralities of first and second component regions, each of the virtual keyboard regions containing similar characteristics; and transmitting the plurality of virtual keyboard regions and their characteristics. Alternatively or additionally to one or more of the examples disclosed above, in some examples the method further comprises saving error vector data exceeding a predetermined threshold; and transmitting the saved error vector data.

Some examples of the disclosure are directed to a computing device for providing keystroke accuracy information for use in performing subsequent operations, comprising: a touch screen capable of displaying a virtual keyboard; and a processor communicatively coupled to the touch screen and capable of receiving error vector data, the error vector data comprising a plurality of error vectors between actual and intended keystroke locations; averaging the error vector data obtained at each of a plurality of locations on a keyboard to generate a bias plot; and transmitting information associated with the bias plot. Alternatively or additionally to one or more of the examples disclosed above, in some examples the processor is further capable of comparing the bias plot to one or more representative bias curves; determining which of the one or more representative bias curves most closely matches the bias plot; characterizing the bias plot in accordance with the representative bias curve that most closely matches the bias plot; and transmitting the characterization of the bias plot.

Some examples of the disclosure are directed to a computing device, comprising: a touch screen configured for displaying a user interface; and a processor communicatively coupled to the touch screen and capable of processing error vector data obtained at a plurality of touch locations on the user interface to generate bias data, the error vector data including a plurality of error vectors between actual and intended touch locations, and modifying the user interface based on the bias data. Alternatively or additionally to one or more of the examples disclosed above, in some examples the processor is further capable of: comparing the bias data to one or more representative bias curves; identifying a particular representative bias curve that matches the bias data; characterizing the bias data in accordance with the particular representative bias curve; and modifying the user interface based on the characterization of the bias data. Alternatively or additionally to one or more of the examples disclosed above, in some examples the one or more representative bias curves include one or more of a right bias curve, a left bias curve, and a no bias curve. Alternatively or additionally to one or more of the examples disclosed above, in some examples the processor is further capable of identifying a plurality of regions in the bias data, each region containing common characteristics. Alternatively or additionally to one or more of the examples disclosed above, in some examples processing the error vector data comprises averaging a first component of the plurality of error vectors at a plurality of first component locations of the user interface to generate first component bias data. Alternatively or additionally to one or more of the examples disclosed above, in some examples the processor is further capable of: comparing the first component bias data to one or more representative bias curves; identifying a particular representative bias curve that matches the first component bias data; characterizing the first component bias data in accordance with the particular representative bias curve; and modifying the user interface based on the characterization of the first component bias data. Alternatively or additionally to one or more of the examples disclosed above, in some examples processing the error vector data further comprises averaging a second component of the plurality of error vectors at a plurality of second component locations of the user interface to generate second component bias data, wherein the first component of the error vectors is orthogonal to the second component of the error vectors. Alternatively or additionally to one or more of the examples disclosed above, in some examples the processor is further capable of: identifying a plurality of first component regions in the first component bias data, each first component region containing common characteristics; and identifying a plurality of second component regions in the second component bias data, each second component region containing common characteristics. Alternatively or additionally to one or more of the examples disclosed above, in some examples the processor is further capable of: identifying a plurality of user interface regions from the identified pluralities of first and second component regions, each of the user interface regions containing common characteristics. Alternatively or additionally to one or more of the examples disclosed above, in some examples the processor is further capable of saving error vector data exceeding a predetermined threshold.

Some examples of the disclosure are directed to a method of providing touch accuracy information, comprising: displaying a user interface; processing error vector data obtained at each of a plurality of touch locations on the user interface to generate bias data, the error vector data including a plurality of error vectors between actual and intended touch locations; and modifying the user interface based on the bias data. Alternatively or additionally to one or more of the examples disclosed above, in some examples the method further comprises receiving the error vector data from a typing auto-correction algorithm. Alternatively or additionally to one or more of the examples disclosed above, in some examples the method further comprises computing the error vector data by determining vectors between an actual keystroke and a closest key location. Alternatively or additionally to one or more of the examples disclosed above, in some examples the method further comprises comparing the bias data to one or more representative bias curves; identifying a particular representative bias curve that matches the bias data; characterizing the bias data in accordance with the particular representative bias curve; and modifying the user interface based on the characterization of the bias data. Alternatively or additionally to one or more of the examples disclosed above, in some examples the one or more representative bias curves include one or more of a right bias curve, a left bias curve, and a no bias curve. Alternatively or additionally to one or more of the examples disclosed above, in some examples the method further comprises identifying a plurality of regions in the bias data, each region containing common characteristics. Alternatively or additionally to one or more of the examples disclosed above, in some examples processing the error vector data comprises averaging a first component of the plurality of error vectors at a plurality of first component locations of the user interface to generate first component bias data. Alternatively or additionally to one or more of the examples disclosed above, in some examples the method further comprises comparing the first component bias data to one or more representative bias curves; identifying a particular representative bias curve that matches the first component bias data; characterizing the first component bias plot in accordance with the particular representative bias curve; and modifying the user interface based on the characterization of the first component bias data. Alternatively or additionally to one or more of the examples disclosed above, in some examples processing the error vector data further comprises averaging a second component of the plurality of error vectors at a plurality of second component locations of the user interface to generate second component bias data, wherein the first component of the error vectors is orthogonal to the second component of the error vectors. Alternatively or additionally to one or more of the examples disclosed above, in some examples the method further comprises identifying a plurality of first component regions in the first component bias data, each first component region containing common characteristics; and identifying a plurality of second component regions in the second component bias data, each second component region containing common characteristics. Alternatively or additionally to one or more of the examples disclosed above, in some examples the method further comprises identifying a plurality of user interface regions from the identified pluralities of first and second component regions, each of the user interface regions containing common characteristics. Alternatively or additionally to one or more of the examples disclosed above, in some examples the method further comprises saving error vector data exceeding a predetermined threshold; and transmitting the saved error vector data.

Some examples of the disclosure are directed to a non-transitory computer-readable storage medium having stored therein instructions, which when executed by a device, cause the device to perform a method comprising: displaying a user interface; processing error vector data obtained at each of a plurality of touch locations on the user interface to generate bias data, the error vector data including a plurality of error vectors between actual and intended touch locations; and modifying the user interface based on the bias data. Alternatively or additionally to one or more of the examples disclosed above, in some examples the method further comprises comparing the bias data to one or more representative bias curves; identifying a particular representative bias curve that matches the bias data; characterizing the bias data in accordance with the particular representative bias curve; and modifying the user interface based on the characterization of the bias data. Alternatively or additionally to one or more of the examples disclosed above, in some examples the method further comprises identifying a plurality of regions in the bias data, each region containing common characteristics.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A computing device, comprising:
a touch screen configured for displaying a user interface; and
a processor communicatively coupled to the touch screen and capable of:
processing touch location error data obtained at a plurality of touch locations on the user interface to generate first and second bias data, the touch location error data including a plurality of touch location errors between actual and intended touch locations, wherein:
the generated first bias data is representative of a first component of at least one of the plurality of touch location errors along a first dimension, and
the generated second bias data is representative of a second component of at least one of the plurality of touch location errors along a second dimension;
comparing the generated first bias data to a first bias curve associated with the first dimension;
comparing the generated second bias data to a second bias curve associated with the second dimension; and
modifying the user interface based on the comparison of the first bias data to the first bias curve and the comparison of the second bias data to the second bias curve.

2. The computing device of claim 1, the processor further capable of:
identifying a particular first bias curve that matches the generated first bias data;
characterizing the generated first bias data in accordance with the particular first bias curve;
identifying a particular second bias curve that matches the generated second bias data; and
characterizing the generated second bias data in accordance with the particular second bias curve.

3. The computing device of claim 1, wherein the first bias curve and the second bias curve include one or more of a right bias curve, a left bias curve, and a no bias curve.

4. The computing device of claim 1, the processor further capable of identifying a plurality of regions in the generated first and second bias data, each region containing common characteristics.

5. The computing device of claim 1, wherein processing the touch location error data comprises:
averaging the first component of the plurality of touch location errors at a plurality of first component locations of the user interface to generate the first bias data, and
averaging the second component of the plurality of touch location errors at a plurality of second component locations of the user interface to generate the second bias data.

6. The computing device of claim 5, wherein the first component of the touch location errors is orthogonal to the second component of the touch location errors.

7. The computing device of claim 6, the processor further capable of:
identifying a plurality of first component regions in the generated first bias data, each first component region containing first common characteristics; and
identifying a plurality of second component regions in the generated second bias data, each second component region containing second common characteristics.

8. The computing device of claim 7, the processor further capable of:
identifying a plurality of user interface regions from the identified pluralities of first and second component regions, each of the user interface regions containing common characteristics.

9. The computing device of claim 7, the processor further capable of saving touch location error data exceeding a predetermined threshold.

10. A method of providing touch accuracy information, comprising:

displaying a user interface;

processing touch location error data obtained at each of a plurality of touch locations on the user interface to generate first and second bias data, the touch location error data including a plurality of touch location errors between actual and intended touch locations, wherein:
the generated first bias data is representative of component of the touch location errors along a first dimension, and
the generated second bias data is representative of a second component of the touch location errors along a second dimension;

comparing the generated first bias data to a first bias curve associated with the first dimension;

comparing the second generated bias data to a second bias curve associated with the second dimension; and modifying the user interface based on the comparison of the first bias data to the first bias curve and the comparison of the second bias data to the second bias curve.

11. The method of claim 10, further comprising receiving the touch location error data from a typing auto-correction algorithm.

12. The method of claim 11, further comprising computing the touch location error data by determining touch location errors between an actual keystroke and a closest key location.

13. The method of claim 10, further comprising:
identifying a particular first bias curve that matches the generated first bias data;
characterizing the generated first bias data in accordance with the particular first bias curve;
identifying a particular second bias curve that matches the generated second bias data; and
characterizing the generated second bias data in accordance with the particular second bias curve.

14. The method of claim 10, wherein the first bias curve and the second bias curve include one or more of a right bias curve, a left bias curve, and a no bias curve.

15. The method of claim 10, further comprising:
identifying a plurality of regions in the generated first and second bias data, each region containing common characteristics.

16. The method of claim 10, wherein processing the touch location error data comprises:
averaging the first component of the plurality of touch location errors at a plurality of first component locations of the user interface to generate first bias data, and
averaging the second component of the plurality of touch location errors at a plurality of second component locations of the user interface to generate the second bias data.

17. The method of claim 16, wherein the first component of the touch location errors is orthogonal to the second component of the touch location errors.

18. The method of claim 17, further comprising:
identifying a plurality of first component regions in the generated first bias data, each first component region containing first common characteristics; and
identifying a plurality of second component regions in the generated second bias data, each second component region containing second common characteristics.

19. The method of claim 18, further comprising:
identifying a plurality of user interface regions from the identified pluralities of first and second component regions, each of the user interface regions containing common characteristics.

20. The method of claim 10, further comprising:
saving touch location error data exceeding a predetermined threshold; and
transmitting the saved touch location error data.

21. A non-transitory computer-readable storage medium having stored therein instructions, which when executed by a device, cause the device to perform a method comprising:
displaying a user interface;
processing touch location error data obtained at each of a plurality of touch locations on the user interface to generate first and second bias data, the touch location error data including a plurality of touch location errors between actual and intended touch locations, wherein:
the generated first bias data is representative of a first component of the touch location errors along a first dimension, and
the generated second bias data is representative of a second component of the touch location errors along a second dimension;
comparing the generated first bias data to a first bias curve associated with the first dimension;
comparing the second generated bias data to a second bias curve associated with the second dimension; and
modifying the user interface based on the comparison of the first bias data to the first bias curve and the comparison of the second bias data to the second bias curve.

22. The non-transitory computer-readable storage medium of claim 21, the method further comprising:
identifying a particular first bias curve that matches the generated first bias data;
characterizing the generated first bias data in accordance with the particular first bias curve;
identifying a particular second bias curve that matches the generated second bias data; and
characterizing the generated second bias data in accordance with the particular second bias curve.

23. The non-transitory computer-readable storage medium of claim 21, the method further comprising:
identifying a plurality of regions in the generated first and second bias data, each region containing common characteristics.

* * * * *